Jan. 16, 1951 — C. SAURER — 2,538,658
RESILIENT MOUNTING FOR MOTORS AND THE LIKE
Filed Oct. 31, 1945

INVENTOR.
CURT SAURER
BY
Oberlin & Limbach
ATTORNEYS

Patented Jan. 16, 1951

2,538,658

UNITED STATES PATENT OFFICE 2,538,658

RESILIENT MOUNTING FOR MOTORS AND THE LIKE

Curt Saurer, Detroit, Mich., assignor, by mesne assignments, to The Ohio Rubber Company, Willoughby, Ohio, a corporation of Delaware Application October 31, 1945, Serial No. 625,807

6 Claims. (Cl. 248—358)

The present improvements, relating as indicated to resilient mountings, have more particular regard to resilient supports such as are quite generally used in automotive vehicles and elsewhere in order to yieldingly support on the frame of the vehicle the internal combustion engine employed to drive the latter. However, it will be understood that the present improved mounting is not limited to any such particular field of use but may be employed generally to provide a yielding structure between two relatively movable members for the purpose of damping vibration and preventing transmission of vibration from one member to the other.

One principal object of the present invention is to provide a simplified form of resilient support for engines or other motors which are subject to vibration wherein provision is made for displacement of the rubber or equivalent resilient element of the device in each of two opposed directions. A further object is to provide for the inclusion in the device of spaces or cavities in which air or like compressible fluid may be confined, subject to controlled release so as to provide either additional resilience or serve as means for damping the action of the device. In connection with such last-mentioned object the invention further includes a new and improved method for providing such cavities incidentally to the vulcanization of the rubber body to a rigid supporting member without requiring complicated molds or undercuts in such body, thereby greatly simplifying the design of the molds employed in forming the latter.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
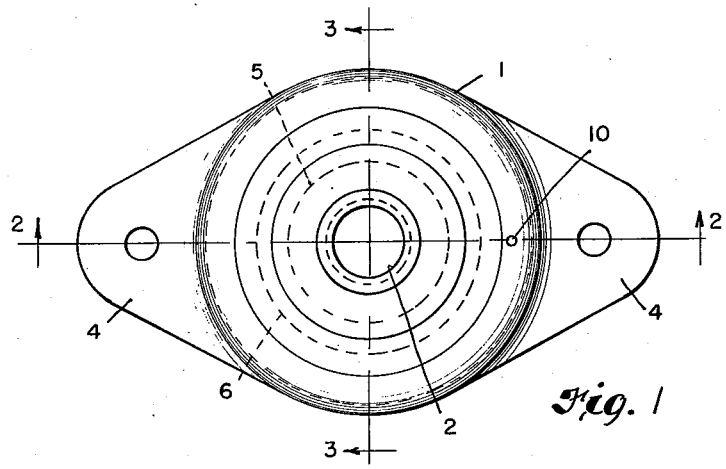
Fig. 1 is a top plan view of a resilient mounting embodying my present improvements.
Figures 3, 4:
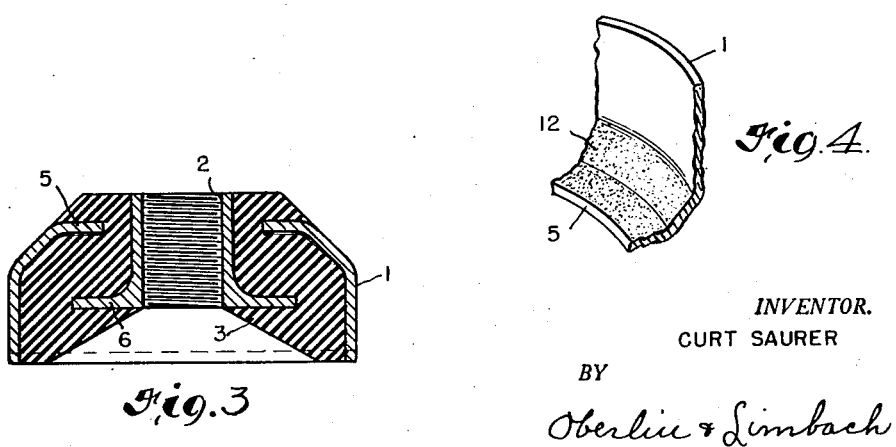

Fig. 3 is a transverse vertical section of the mounting by itself taken on the plane indicated by the line 3—3 Fig. 1 and showing the parts thereof in the position occupied in unloaded condition; and Fig. 4 is an internal perspective view of the surrounding shell or housing in which the resilient body is contained and to which it is vulcanized, said figure further illustrating a step in the vulcanizing process whereby a desired cavity is formed within such body.

Figure 2:
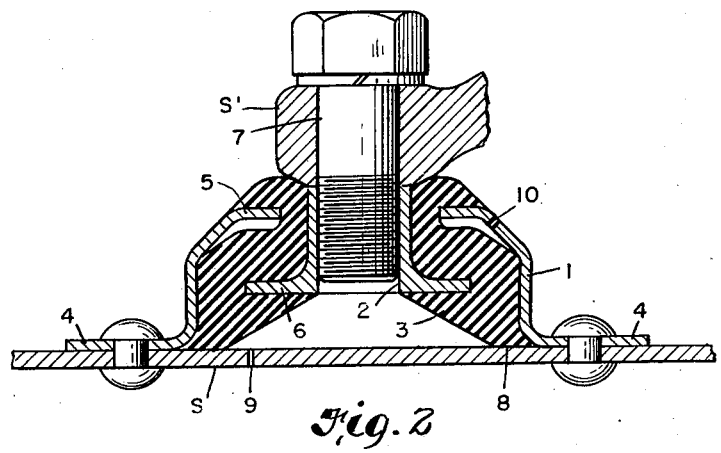
Fig. 2 is a longitudinal vertical section thereof taken on the plane indicated by the line 2—2 Fig. 1 and showing the mounting as attached to typical supporting and supported members, the relative movement between which such mounting serves to control, the parts of the mounting being shown in the position occupied under load.

Referring to Fig. 2, it will be noted that said figure illustrates my improved mounting in association with a supporting member S, which for the purpose of illustration may be part of the frame of an automotive vehicle, and a supported member S' which similarly may be an outwardly extending bracket or foot on an engine or motor. As previously indicated, the function of the mounting is to interpose a resilient connection between the two members whereby relative movement between the same may be properly limited and controlled.

The principal elements of the mounting in the form illustrated comprise a shell or housing 1, a member 2 axially disposed within said housing and a concavo-convex body of rubber or equivalent resilient material interposed between and bonded to said housing and axially disposed member.

Said housing 1 is designed to be attached to supporting member S and will preferably be made in the form of a hollow metal stamping of generally cylindrical form having laterally extending webs 4 at its lower end, whereby it may be bolted, riveted or otherwise attached to said member S. At its upper end the housing is formed with an inwardly directed flange 5 and preferably the immediately adjacent portion of the side wall will flare inwardly from the strictly vertical portion of such wall.

The axially movable member 2, as illustrated, takes the form of an internally threaded sleeve or spindle that is provided at its lower end with an outwardly directed flange 6, the diameter of which is substantially greater than the internal diameter of the opening at its upper end of housing 1 as defined by inwardly directed flange 5. In other words, as will clearly appear from an inspection of Figs. 2 and 3, the flanges 5 and 6 overlap radially a substantial distance. Supported member S' may be conveniently secured to the axially movable member 2 by means of a set bolt 7 which passes through said member and is threaded into the bore of said member 2.

As previously indicated, the body 3 of resilient material that is interposed between and bonded to the housing 1 and the axially disposed member 2 is of generally concavo-convex form. As clearly shown in Figs. 2 and 3, on its convex side said body extends above and incorporates the inwardly directed flange 5 on said housing, the outer convex surface of the body above said flange conforming with the slope of the adjacent inwardly flared portion of the side wall of the housing. The concave side of resilient body 3 is directed toward supporting member S and has a peripheral edge 8 of sufficient radial extent to form a sealing contact with said member. Accordingly, where the latter, as shown, is in the form of a plate, such concave side of body 3 in conjunction with the latter forms a closed chamber to which air may enter or from it may be expelled through a breather opening 9.

While, as previously stated, the concavo-convex body 3 of resilient material is bonded to the housing 1, this is not the case throughout the entire extent of their normally contacting surfaces, which is the state illustrated in Fig. 3. Instead, an annular area of said body lying directly beneath flange 5 of the housing and desirably extending outwardly therebeyond to the point where the flaring portion of the housing side wall merges with the cylindrical wall thereof (see Fig. 2), there is no bond between said body and housing. Accordingly, upon axial movement of member 2 in a downward direction, as viewed in Fig. 2 and 3, and resultant distortion of the body 3 of resilient material, the unbonded annular area of the latter will draw away from the adjacent inner surface of the housing to provide an encircling cavity between the main portion of body 3 and flange 5, in which air may flow and from which it may be expelled through a breather opening 10.

The mode of operation of the mounting will be readily apparent from the foregoing description of its construction. Under normal load the portion of the resilient body 3 which lies above the inwardly directed flange 5 of housing 1 will be subjected to a certain degree of compression and this is likewise true of the lower annular portion of said body which lies below the outwardly directed flange 6 on the axially movable member 2. Upon any increase in load or sudden downward impact being applied under said member, the portions of the resilient body just referred to will be further compressed and such downward movement will be additionally cushioned by compression of the air confined between the concave face of said body and supporting member S since such air can only escape at a slow regulated rate through the breather opening 9. Upon rebound movement of member 2 the body of air in the annular cavity beneath the inwardly directed flange 5 of the housing will similarly be compressed, escaping only slowly through breather opening 10, and when the unbonded annular area of the resilient body contacts with such flange, or in other words resumes the normal unloaded condition illustrated in Fig. 3, the portion of such body lying between the flange just referred to and the outwardly directed flange on the lower end of axially movable member 2 will be placed under compression, thus further resisting upward movement of said member, or in other words, of supported member S' relatively to supporting member S.

For the purpose of providing the annular air space between the resilient body 3 and inwardly directed flange 5 of the housing the following improved method or process of manufacture will be desirably employed, such method or process so far as I am advised being entirely new in the rubber industry. As shown in Fig. 4, the portion of the inner surface of the housing 1 which serves to define the cavity to be formed has applied thereto a flux coating 12 which may consist of any known, so-called "anti-stick" composition for preventing adhesion of rubber to metal. A sheet of paper or of a suitable fabric, treated or untreated, cut to the proper shape may also be used.

After such coating is thoroughly dried a coating of adhesive cement such as is commonly used to obtain a bond between rubber or rubber-like material and steel or other metal parts is then applied over the entire inner surface of the housing as well as the upper face of the inwardly directed flange 5, it being with such surface and face that the body 3 is designed to contact in normal unloaded condition. The housing, with the axially movable member 2 located in proper position within the same, and a suitable mass of rubber composition, are then placed in a mold (not shown) having the proper conformation to impart to the exposed faces of the body 3 the form or contour which they are to have in the finished article. Thereupon such parts in the mold are subjected to the proper vulcanization temperature and upon removal the finished mounting, as illustrated, is presented.

The interior air space of course becomes operative only after the load is applied to the mounting, whereupon the annular area of the body 3 which normally contacts with the portion of the inner surface of the housing to which flux coating 12 was applied will be free to draw away from such surface, the extent of the resulting cavity depending upon the degree of distortion or deflection to which the body 3 is subjected.

It will be understood that the method just described for thus providing a desired cavity in the present improved resilient mounting is applicable to other varied constructions in order to provide confining areas which can be adhered or loosened at the will of the designer to provide a variety of combinations, such as damping by friction against a surface, without the necessity of using complicated molds, undercuts in the body of rubber, or equivalent resilient material, or use of special friction areas. Not only is the manufacturing procedure thus greatly simplified, but a much superior device of the general type in question, i. e. one wherein it is desired to utilize the combined effect of an air chamber with a body of resilient material, is obtained. It is of course unnecessary to use air as the damping medium to fill the cavity, but other compressible fluids may be used, or such cavity may be used to provide hydraulic damping.

In describing certain parts of the device as made of rubber, it will be understood that this term is intended to connote not only the product resulting from the vulcanization of natural rubber, but also neoprene and other synthetic rubbers or rubber substitutes which are now available.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a resilient mounting designed to connect a supporting and a relatively movable supported member, the combination of a housing of general cylindrical form adapted to be mounted at one end on such supporting member, said housing having an inwardly directed flange at its other end, a member axially disposed within said housing and adapted to be connected to such supported member, and a concavo-convex body of resilient material interposed between and bonded to said housing and axially disposed member, said body on its convex side extending above and incorporating the flange on said housing, and an annular area of said body beneath such flange being unbonded therewith whereby a cavity is formed between such area and flange upon compression of said body in an axial direction.

2. In a resilient mounting designed to connect a supporting and a relatively movable supported member, the combination of a housing of general cylindrical form adapted to be mounted at one end on such supporting member, said housing having an inwardly directed flange at its other end, a member axially disposed within said housing and adapted to be connected to such supported member, and a concavo-convex body of resilient material interposed between and bonded to said housing and axially disposed member, said body on its convex side extending above and incorporating the flange on said housing and having a peripheral edge on its concave side adapted to contact with such supporting member and form therewith a closed chamber, an annular area of said body beneath such flange being unbonded therewith whereby a cavity is formed between such area and flange upon compression of said body in an axial direction.

3. In a resilient mounting designed to connect a supporting and a relatively movable supported member, the combination of two rigid parts, one adapted to be attached to said supporting and the other to said supported member, and a body of resilient material bonded to and thereby connecting said parts, whereby relative movement of the latter may be had upon distortion of said body, an unbonded area surrounded by contacting, bonded faces being left between said body and one of said parts, whereby such area is free to draw away from the opposed surface.

4. A mechanical element comprising a rigid part and a body of resilient material bonded to said part, an unbonded area surrounded by contacting, bonded faces being left between said body and part, whereby such area is free to draw away from the opposed surface upon distortion of said body, said part having an opening leading to such surface.

5. The method of forming a resilient mounting unit having two rigid metal members connected by a molded resilient rubber body, which comprises coating a local area of one such rigid member with material effective to inhibit adhesion of rubber thereto, molding a rubber body to the portion of such member including such area, bonding such rubber to such member about such area, and securing the other such member to such rubber body.

6. A resilient mounting comprising a metal collar having an inturned flange at one end thereof, a separate relatively movable metal member disposed generally axially of said collar and having an outwardly directed flange within the confines of said collar but spaced from said first flange, and a body of resilient rubber molded within said collar conforming and bonded to the opposed surfaces of said two metal members but having an annular unbonded area around the inner side of such inturned flange entirely bounded by bonded areas.

CURT SAURER.

REFERENCES CITED

The following references are of record in the file of this patent:

UNITED STATES PATENTS

| Number | Name | Date |
|---|---|---|
| 1,871,963 | Dill | Aug. 16, 1932 |
| 1,930,310 | Geyer | Oct. 10, 1933 |
| 2,115,458 | Geyer | Apr. 26, 1938 |
| 2,132,840 | Workman | Oct. 11, 1938 |
| 2,215,743 | Saurer | Sept. 24, 1940 |
| 2,241,385 | Beal | May 13, 1941 |
| 2,248,934 | Auzin | July 15, 1941 |
| 2,451,194 | Braun | Oct. 12, 1948 |